United States Patent
Williams et al.

(10) Patent No.: US 10,232,333 B2
(45) Date of Patent: Mar. 19, 2019

(54) AZIMUTHALLY OSCILLATING MEMBRANE EMULSIFICATION FOR CONTROLLED DROPLET PRODUCTION

(71) Applicant: Micropore Technologies Ltd, Thornaby (GB)

(72) Inventors: Bruce Williams, Stockton-On-Tees (GB); Richard Holdich, Loughborough (GB); Iain Cumming, Stockton-On-Tees (GB); Pedro Silva, Stockton-On-Tees (GB); David Hayward, Stockton-On-Tees (GB)

(73) Assignee: MICROPORE TECHNOLOGIES LTD., Thornaby, Stockton-On-Tees (GB)

( * ) Notice: Subject to any disclaimer, the term of this patent is extended or adjusted under 35 U.S.C. 154(b) by 142 days.

(21) Appl. No.: 15/207,692

(22) Filed: Jul. 12, 2016

(65) Prior Publication Data
US 2018/0015432 A1   Jan. 18, 2018

(51) Int. Cl.
*B01F 3/08*   (2006.01)
*B01F 11/00*   (2006.01)
(Continued)

(52) U.S. Cl.
CPC ........ *B01F 17/0021* (2013.01); *B01F 3/0807* (2013.01); *B01F 3/0865* (2013.01); *B01F 5/0465* (2013.01); *B01F 11/0082* (2013.01); *B01F 11/0088* (2013.01); *B01F 2003/0834* (2013.01); *B01F 2215/0431* (2013.01)

(58) Field of Classification Search
CPC ............ B01F 11/0088; B01F 11/0082; B01F 5/0465; B01F 2003/0834; B01F 17/0021; B01F 3/0865; B01F 3/0807; B01F 2215/0431
See application file for complete search history.

(56) References Cited

U.S. PATENT DOCUMENTS

| 1,140,548 | A | * | 5/1915 | Vogelsang | ............ | B01F 5/0413 |
| | | | | | | 137/888 |
| 1,691,544 | A | * | 11/1928 | Dow | ....................... | D06F 13/02 |
| | | | | | | 366/276 |

(Continued)

FOREIGN PATENT DOCUMENTS

GB   2444035 A * 5/2008   ............ B01F 3/0819

OTHER PUBLICATIONS

Gomaa, H., Liu, J., Sabouni, R., & Zhu, J. (2014). Operational characteristics of oscillatory micro-screen emulsifier: Coupling effects and energy dissipation. Chemical Engineering Science,117, 161-172. doi:10.1016/j.ces.2014.06.03712 pages t (Year: 2014).*

(Continued)

*Primary Examiner* — Tony G Soohoo
(74) *Attorney, Agent, or Firm* — K&L Gates LLP

(57) ABSTRACT

An apparatus for membrane emulsification. In one embodiment, the apparatus comprises a membrane defining a plurality of apertures connecting a first phase on a first side of the membrane to a second phase on a second, different side of the membrane, such that egression of the first phase into the second phase via the plurality of apertures creates an emulsion, and wherein the membrane is an oscillating cylindrical membrane.

18 Claims, 12 Drawing Sheets

Figure 2B:
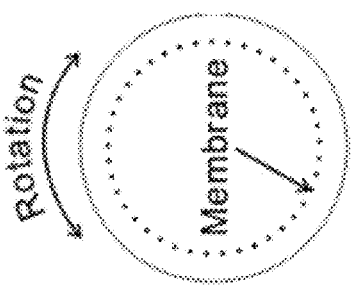

(51) Int. Cl.
*B01F 17/00* (2006.01)
*B01F 5/04* (2006.01)

(56) References Cited

U.S. PATENT DOCUMENTS

| | | | | |
|---|---|---|---|---|
| 5,234,608 | A * | 8/1993 | Duff | A61M 1/34 210/143 |
| 6,099,730 | A * | 8/2000 | Ameer | A61M 1/16 210/321.67 |
| 7,972,543 | B2 * | 7/2011 | Nakajima | B01F 3/0807 264/11 |
| 2009/0211991 | A1* | 8/2009 | Kosvintsev | B01D 17/041 210/780 |
| 2011/0038901 | A1* | 2/2011 | Windhab | B01F 3/0815 424/401 |
| 2011/0220586 | A1* | 9/2011 | Levitt | B01D 29/117 210/741 |
| 2012/0055887 | A1* | 3/2012 | Love | B01D 33/073 210/798 |
| 2014/0264984 | A1* | 9/2014 | Kosvintsev | B01J 2/12 264/8 |

OTHER PUBLICATIONS

Liu, Jiangshan, "Oil-in-water Emulsification Using Oscillatory Microscreen" (2013). Electronic Thesis and Dissertation Repository. 1461. https://ir.lib.uwo.ca/etd/1461 (Year: 2013).*

Holdich, R., Dragosavac, M., Vladisavlvic, G., & Kosvintsev, S. (2010). Membrane Emulsification with Oscillating and Stationary Membranes. Ind. Eng. Chem. Res., 49, 3810-3817. Retrieved from https://pubs.acs.org/doi/abs/10.1021/ie900531n. (Year: 2010).*

Egidi, E., Gasparini, G., Holdich, R. G., Vladisavljević, G. T., & Kosvintsev, S. R. (2008). Membrane emulsification using membranes of regular pore spacing: Droplet size and uniformity in the presence of surface shear. Journal of Membrane Science, 323(2), 414-420. doi:10.1016/j.memsci.2008.06.047 (Year: 2008).*

Silva et al., "Azimuthally Oscillating Membrane Emulsification for Controlled Droplet Production", American Institute of Chemical Engineers AIChE Journal, 00(00):1-9, 2015, DOI 10.1002/aic.14894.

* cited by examiner

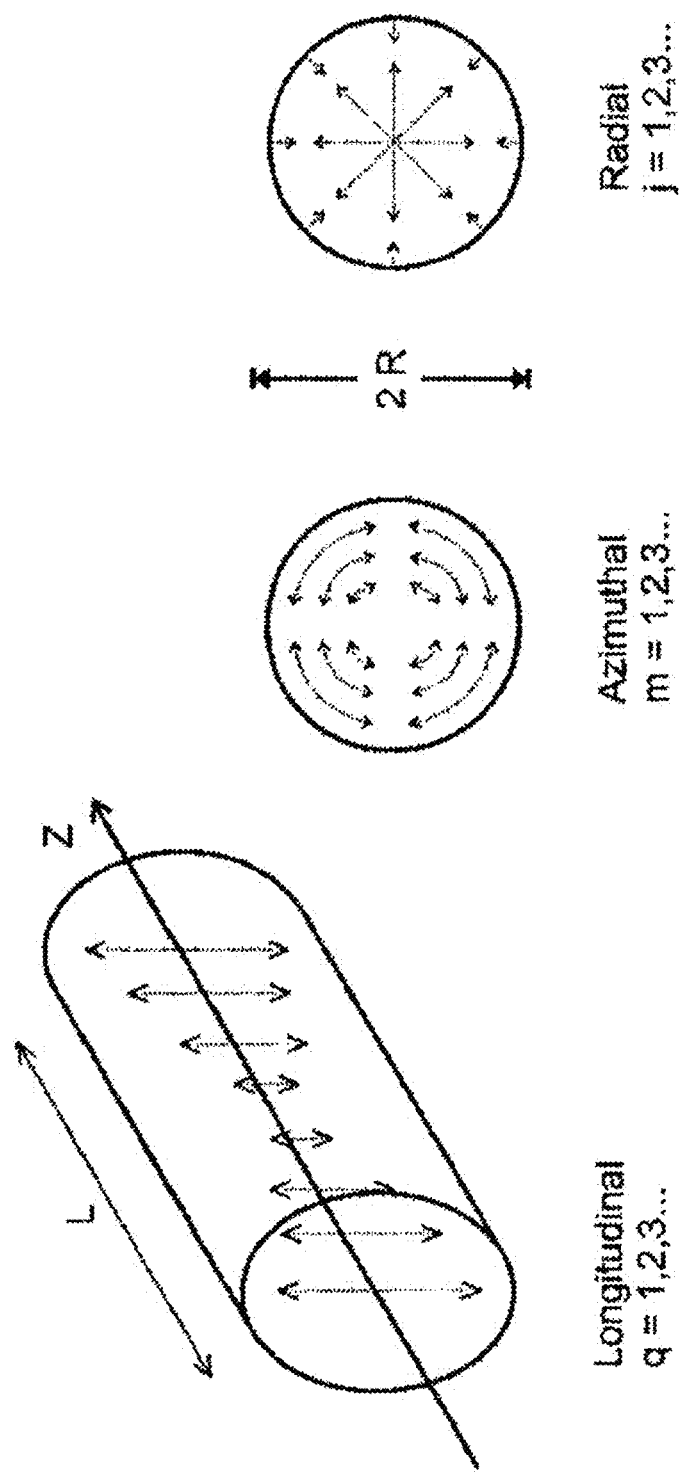
Figure 1: schematic representation of the longitudinal, azimuthal and radial modes of oscillation of a cylinder

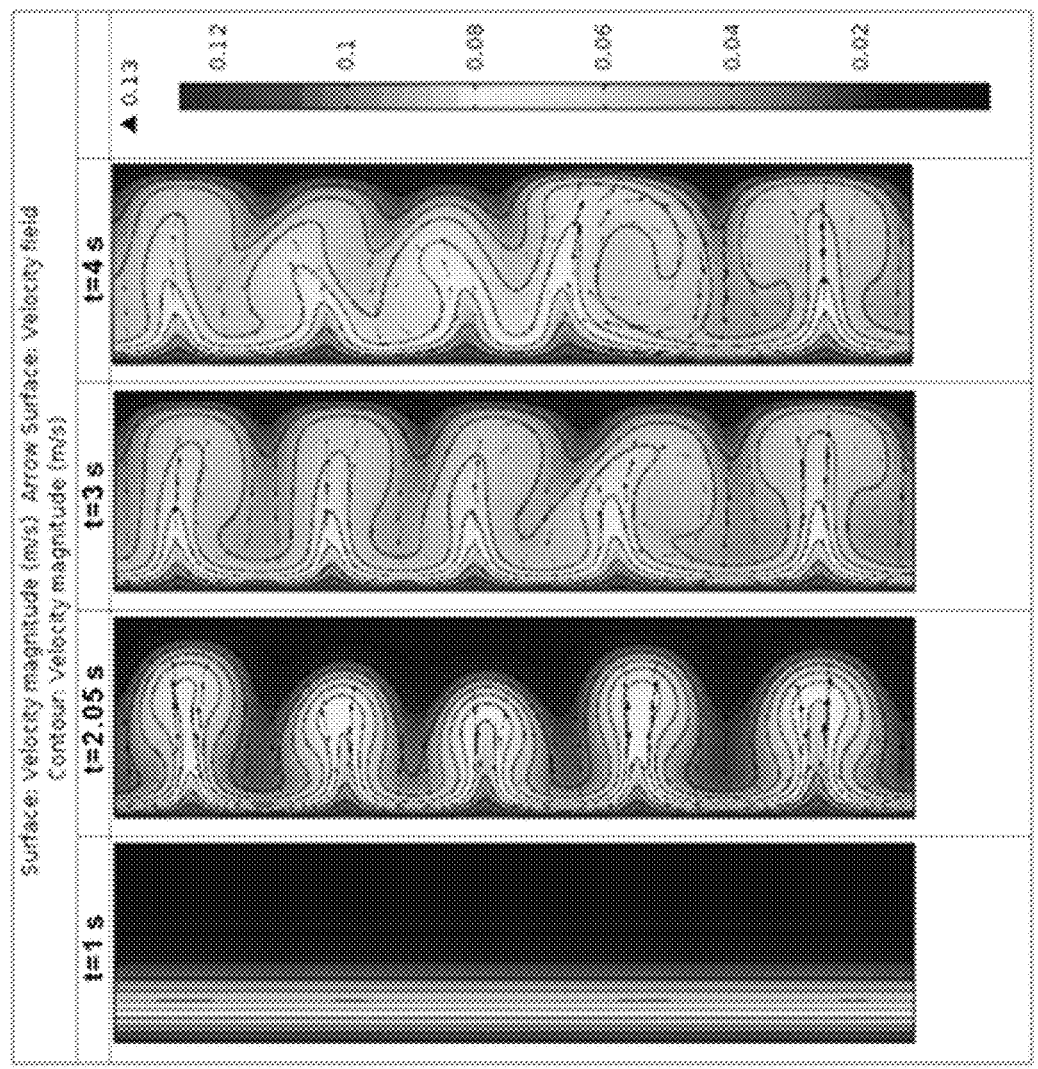
Figure 3: CFD modelling of full rotation of cylindrical membrane showing the formation and shedding of Taylor vortices with time from the surface of the membrane

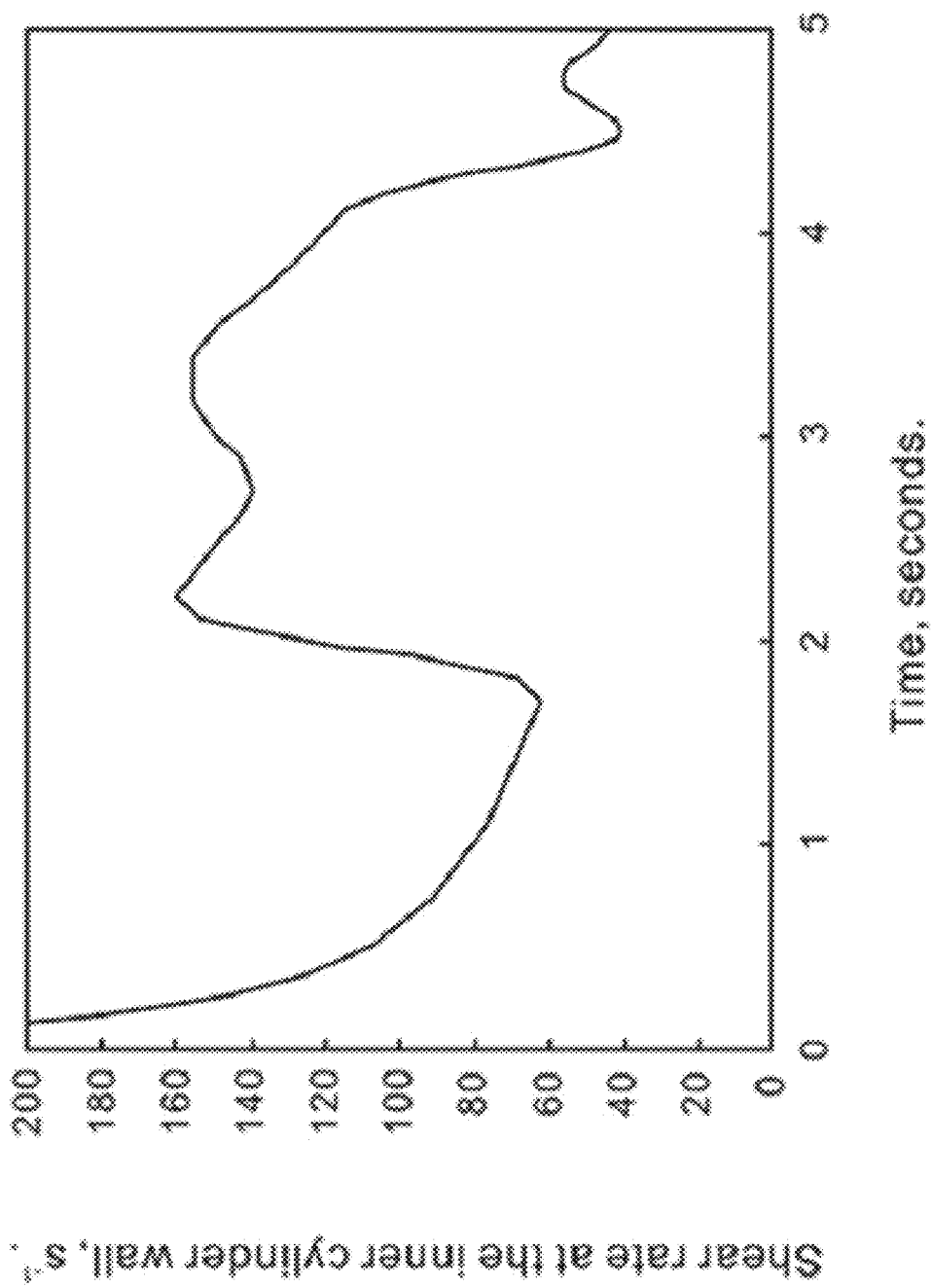
Figure 4: CFD modelling of full rotation of cylindrical membrane showing the shear rate at the surface of the membrane variation with time and the influence of the vortex shedding at the membrane

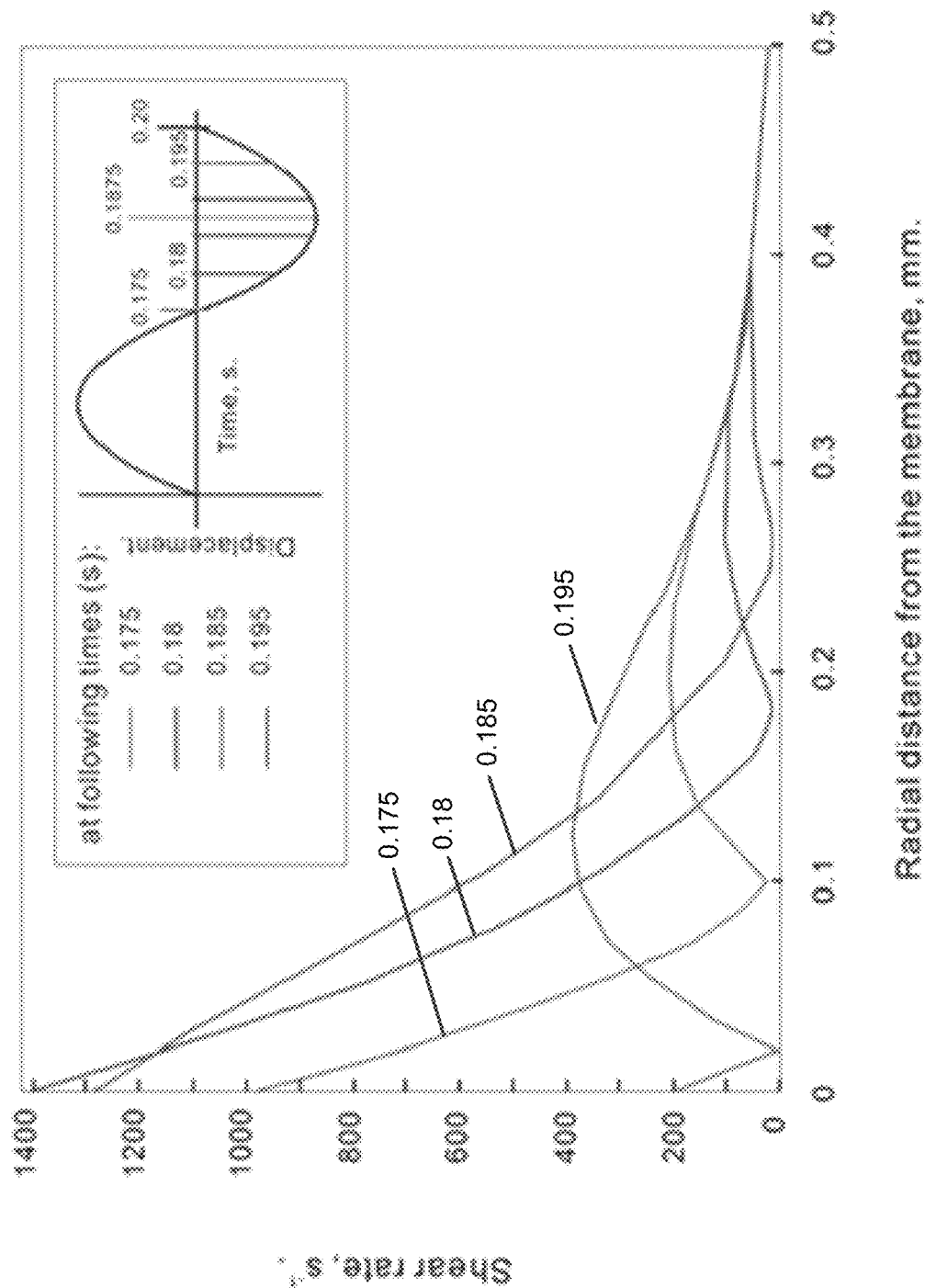
Figure 5: CFD modelling of oscillatory rotation of cylindrical membrane at 20 Hz showing the shear rate at the surface of the membrane variation with distance from the membrane surface for four fixed times during a cycle

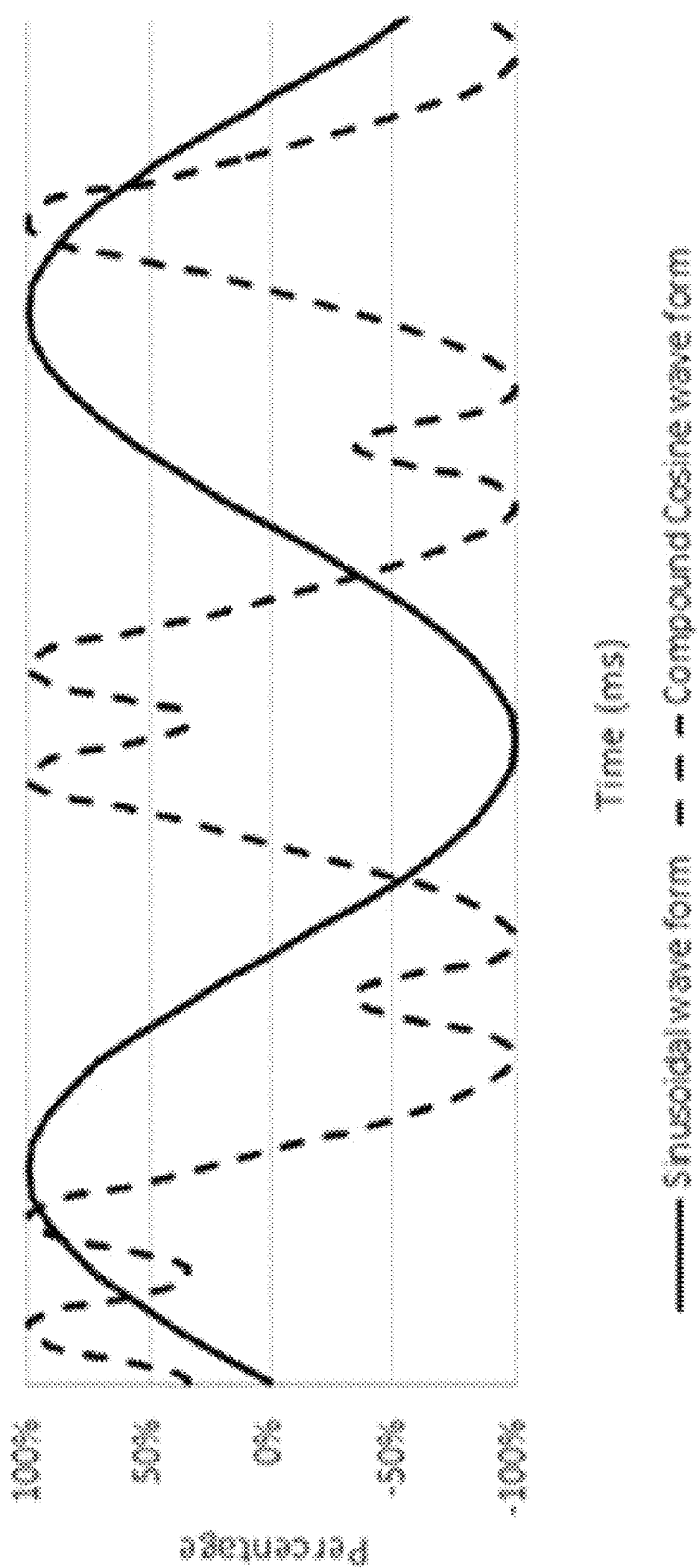
Figure 6: Oscillation wave form profiles used in the experiments

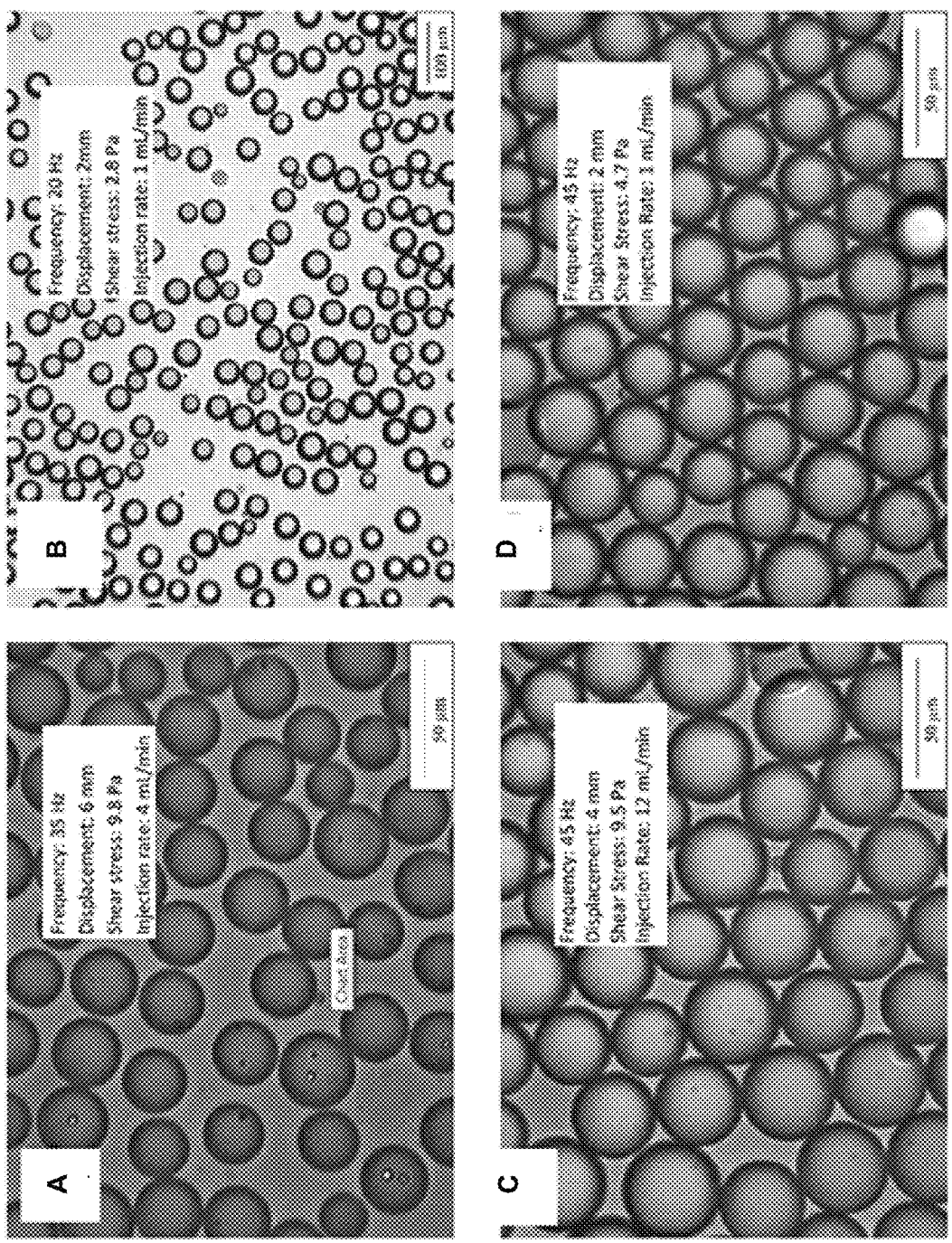
Figure 7: Photographs of emulsions produced using different operational parameters: A and B use compound cosine wave form; C and D use a sinusoidal wave form

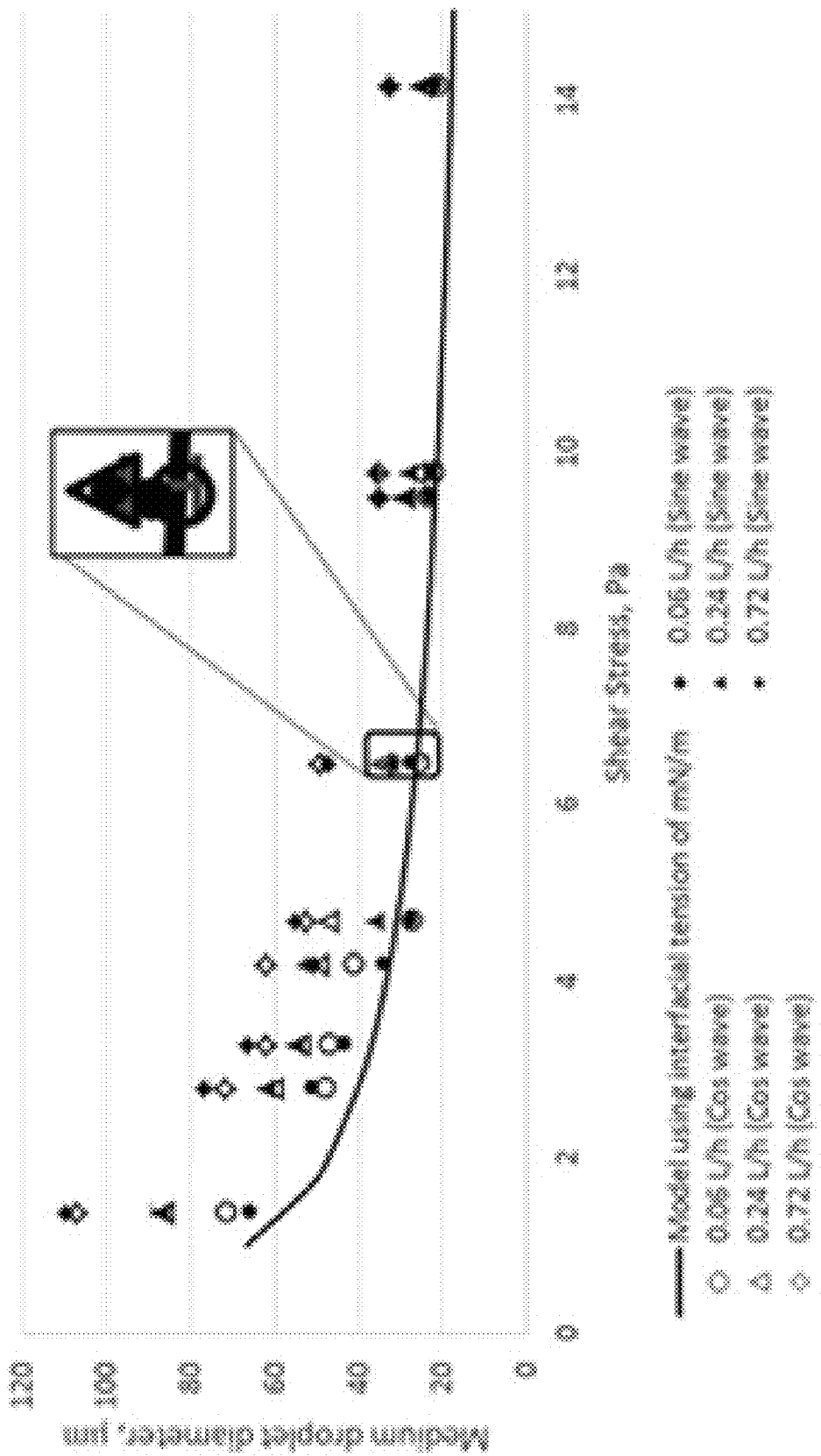
Figure 8A: Droplet size as a function of shear stress at different injection rates using two different wave forms: compound modified cosine (open symbols) and sinusoidal (closed symbols)

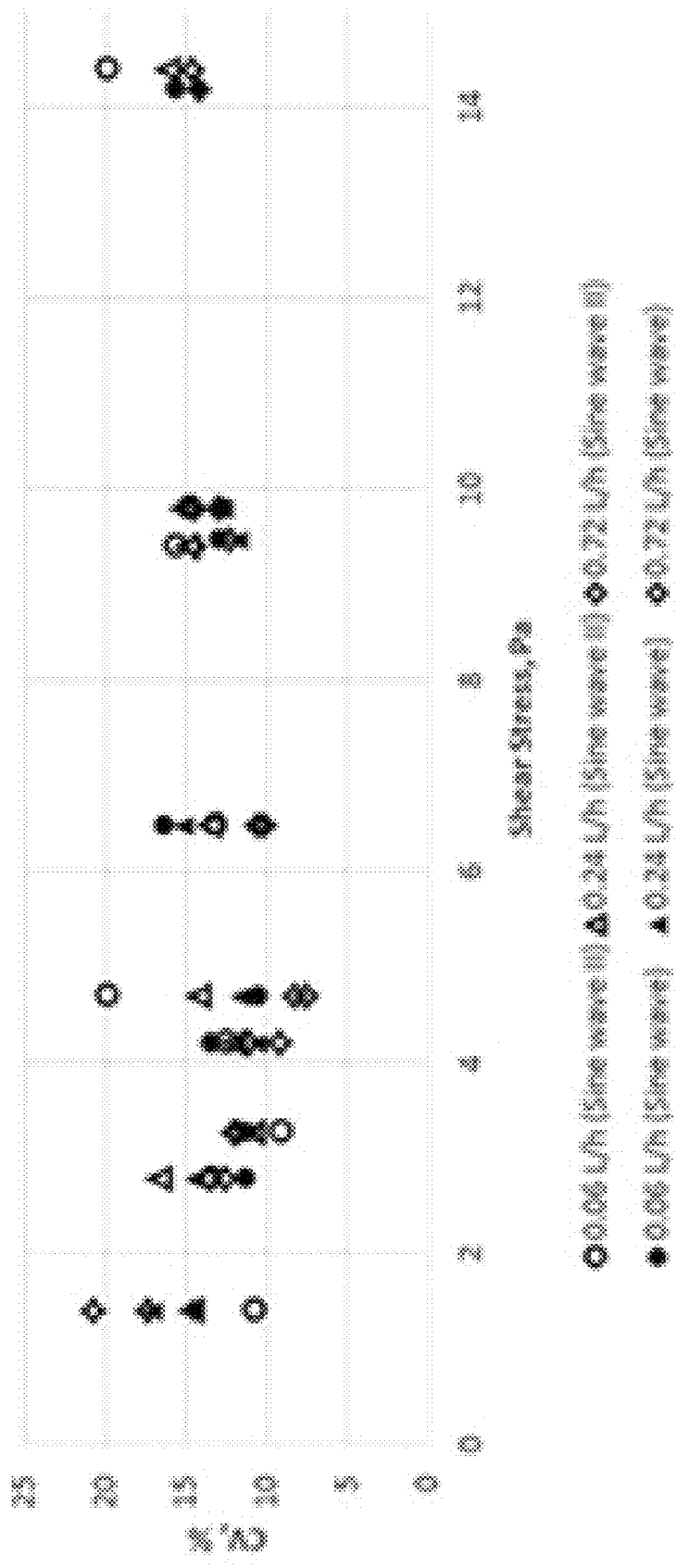
Figure 8B: CV as a function of shear stress at different injection rates using two different wave forms: compound modified cosine (open symbols) and sinusoidal (closed symbols)

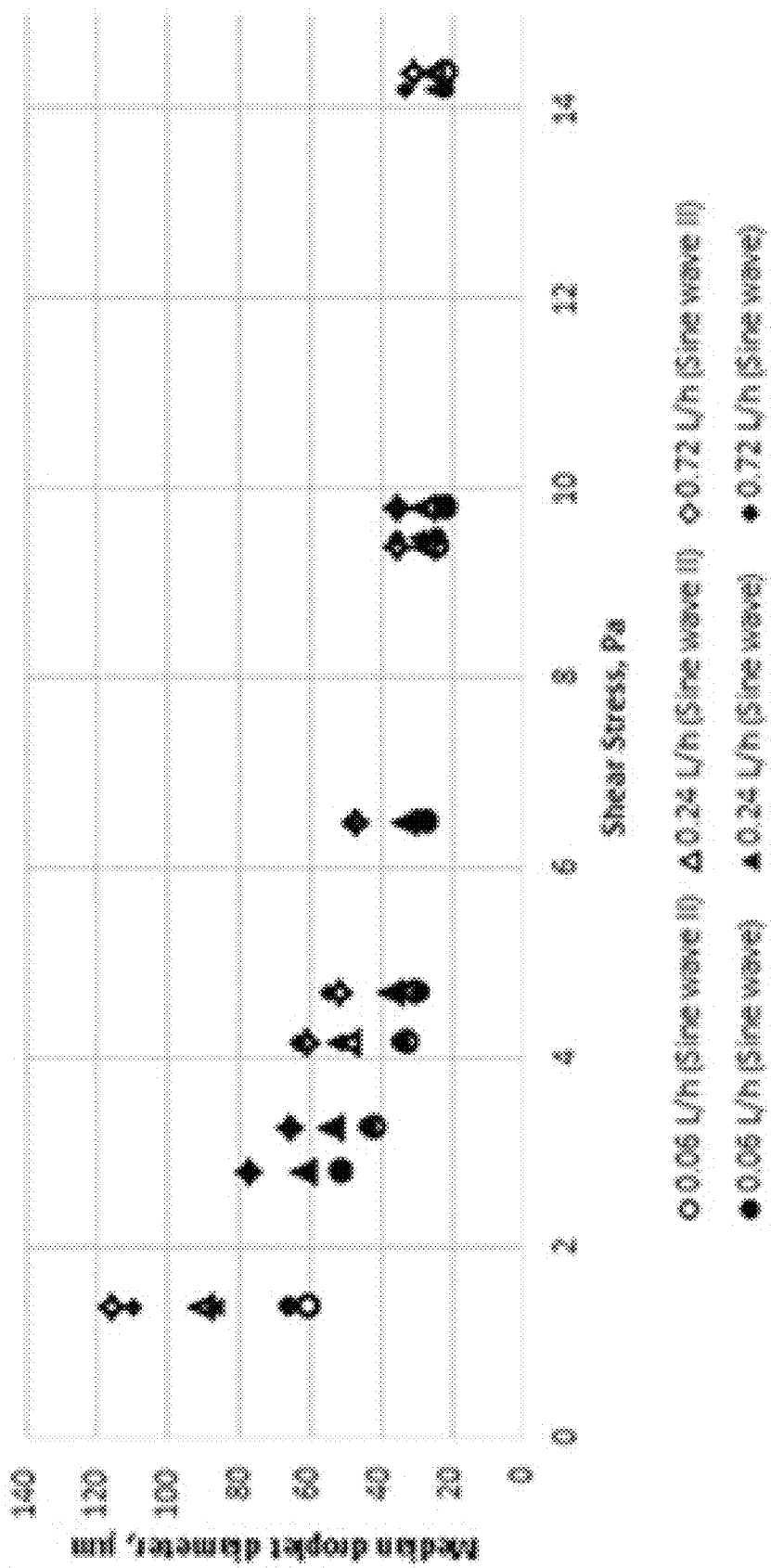
Figure 9A: Droplet size as a function of shear stress obtained with same shear stress using different combinations of displacement and frequency: Sine waves I and II use data obtained under conditions reported in Tables 1 and 2, respectively

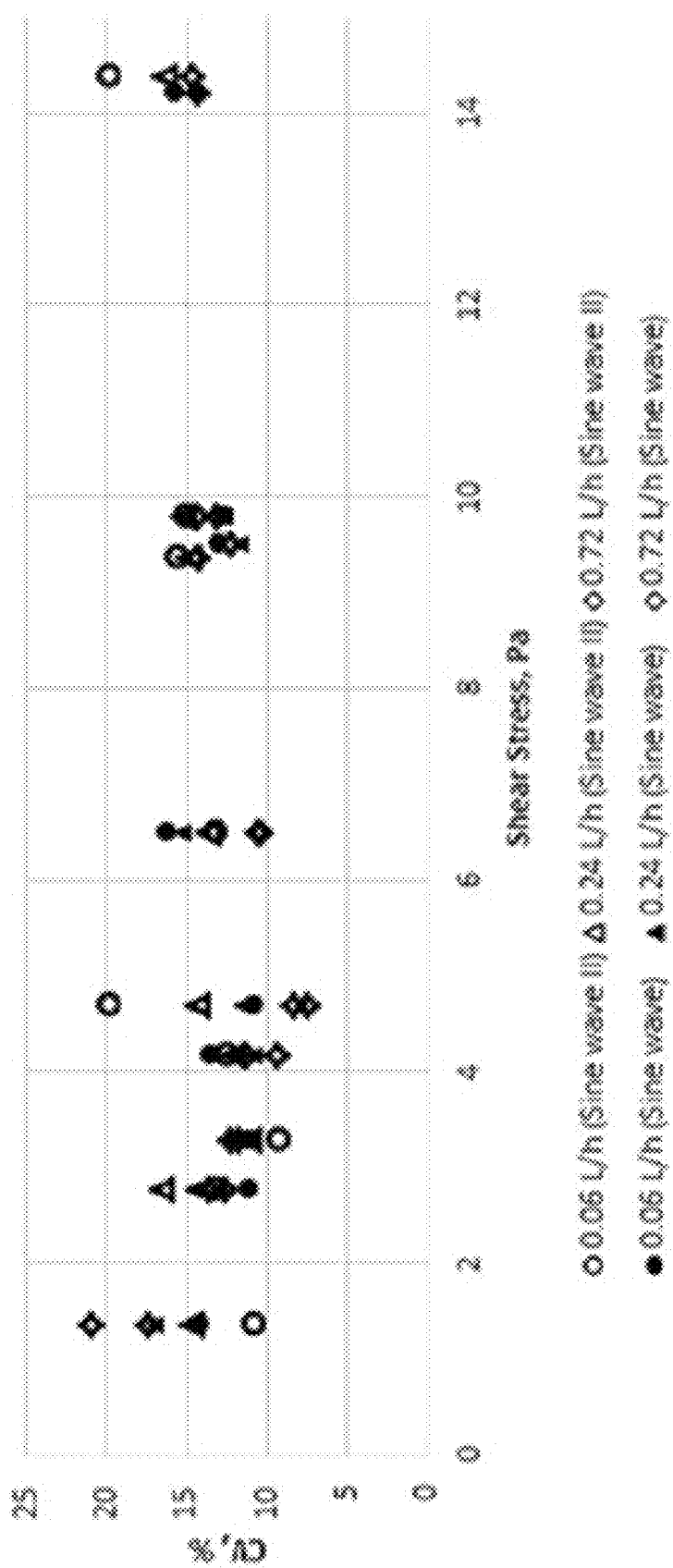
Figure 9B: CV as a function of shear stress obtained with same shear stress using different combinations of displacement and frequency: Sine waves I and II use data obtained under conditions reported in Tables 1 and 2, respectively

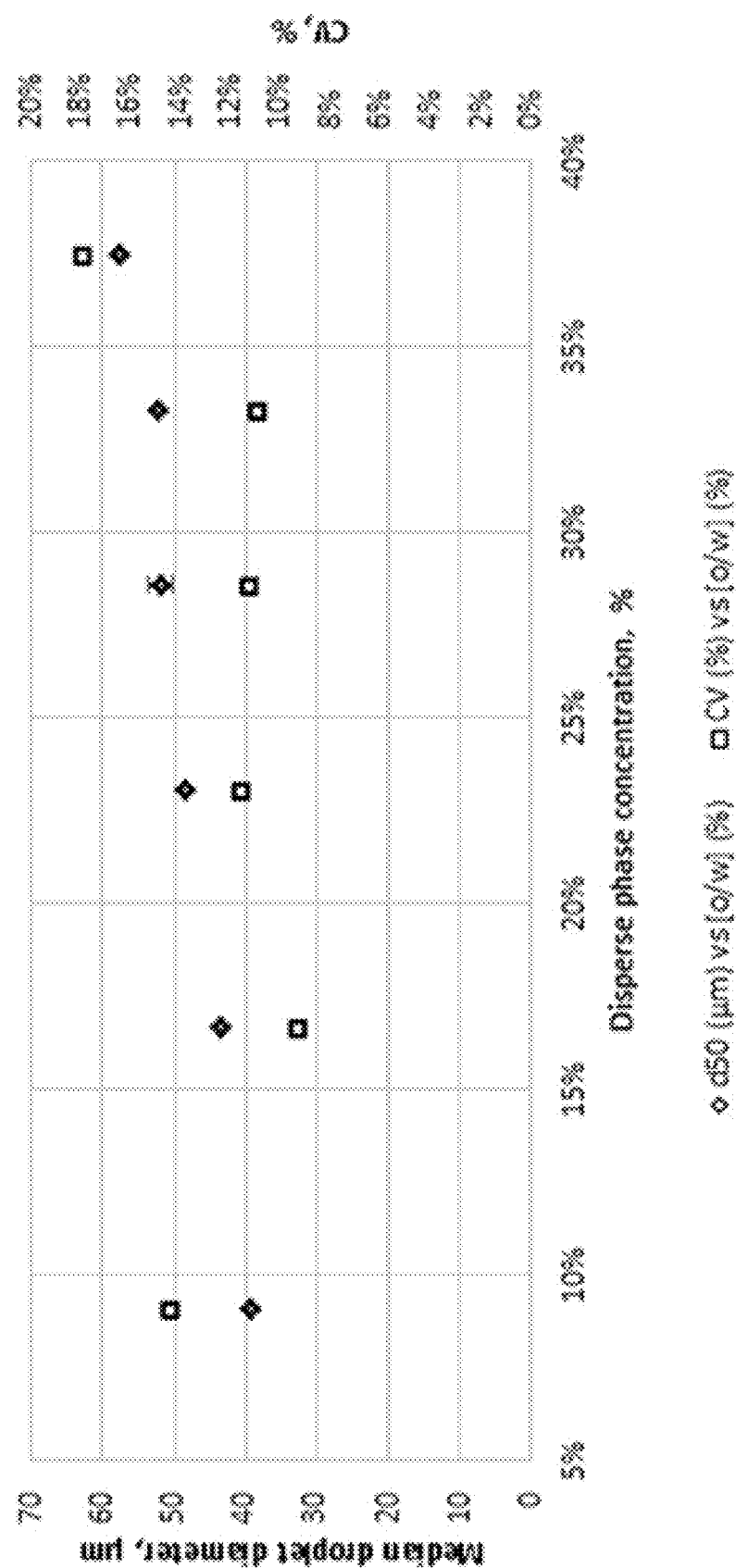
Figure 10: Droplet size and CV variation as a function of oil phase in emulsion concentration using a sinusoidal wave form.

AZIMUTHALLY OSCILLATING MEMBRANE EMULSIFICATION FOR CONTROLLED DROPLET PRODUCTION

FIELD OF THE INVENTION

The present invention relates to a novel membrane emulsification (ME) system.

More particularly, the present invention relates to a novel membrane emulsification (ME) system comprising a tubular metal membrane, periodically azimuthally (tangentially) oscillated with frequencies of, for example, up to 50 Hz and displacement of, for example, 7 mm in a cross flowing continuous phase.

BACKGROUND TO THE INVENTION

A computational fluid dynamics (CFD) analysis showed consistent axial shear at the membrane surface, which became negligible at distances from the membrane surface greater than 0.5 mm. For comparison, CFD analysis of a fully rotating ME system showed local vortices in the continuous phase leading to a variable shear along the axis of the membrane. Using an azimuthally oscillating membrane, oil-in-water emulsions were experimentally produced with a controllable median diameter within the range of 20-120 µm, i.e. a substantial portion of the droplets has a median diameter of 20-120 µm; and a coefficient of variation of droplet size of 8%. The drop size correlated with shear stress at the membrane surface using a force balance. In a single pass of continuous phase, it was possible to achieve high dispersed phase concentrations of 40% v/v.

The production of an emulsion using a microporous membrane developed in popularity as a laboratory study in 1990s, after a publication by Nakashima et al. It became known as membrane emulsification (ME) in which a liquid dispersed phase is injected through the pores of a membrane into a continuous, often cross-flowing, liquid phase. Droplets formed at the pore outlet are detached by the shear created by the flow of the continuous phase on the membrane surface.

Conventionally, in ME the membrane remains stationary and shear stress is applied at the membrane/continuous phase interface to obtain a desired droplet size distribution. Initially, in these systems shear stress was provided by crossflow: higher shear stress provides smaller drops and is obtained by higher continuous phase flow rates, which, in general, leads to lower dispersed phase concentrations of a product for a "single pass" of the continuous phase over the membrane surface.

To overcome this productivity restriction, recirculation of the emulsion can be used. However, when aiming to produce large droplets, recirculation is likely to result in droplet damage within the pump and other fittings present in the system, leading to poor control over the droplet size distribution, limiting the use of this particular ME technique to small emulsion sizes: typically less than 10 µm.

Alternative methods for generating shear at the membrane surface have been described, using stationary membrane systems where shear stress results from stirring, or using pulsed (oscillatory) flow of the continuous phase. Other ME systems have been reported using non-stationary membranes, in which case droplet detachment from the membrane surface is promoted by rotating or vibrating the membrane. In non-stationary membranes, shear stress on the membrane surface is controlled by the speed of membrane rotation, or the frequency and displacement of membrane oscillation/vibration. A major advantage of using a non-stationary mechanically driven membrane is that it "decouples" the control of the drop size by the applied shear from the crossflow of the continuous phase used to remove the product. Hence, in a single pass of continuous phase it is possible to achieve high dispersed phase concentrations of 40% v/v, or more, without recirculation through pumps and fittings.

However, the nature of the mechanically driven membrane does have other consequences. For example, in the case of a fully rotating membrane a centrifugal field will be induced around a rotating membrane. In the most common case of an oil drop being less dense than the surrounding aqueous phase, this will induce flow of the oil drop toward the membrane surface, which is not desirable as the concentration of drops at the membrane surface will increase leading to greater chance of coalescence and wetting of the membrane by the oil phase. Furthermore, having high shear consistently applied in one direction will cause deformation of the emerging oil drops; distorting them in one direction, something highly visible in computational fluid dynamics (CFD) modelling of drops emerging during emulsification, which is again likely to lead to membrane surface wetting and poor drop size control.

SUMMARY OF THE INVENTION

It will be understood that a generally cylindrical membrane can be oscillated longitudinally, azimuthally, and radially (see FIG. 1 herein). The present invention provides a novel azimuthally oscillating membrane emulsification (OME) system is reported using a non-stationary cylindrical membrane that is rotated backwards and forwards, rather than being fully rotated as described in previous studies.

Therefore, according to a first aspect of the invention there is provided apparatus for membrane emulsification, said apparatus comprising a membrane defining a plurality of apertures connecting a first phase on a first side of the membrane to a second phase on a second different side of the membrane, such that egression of the first phase into the second phase via the plurality of apertures creates an emulsion; and wherein the membrane is an oscillating cylindrical membrane.

In a particular embodiment of the present invention, the oscillating membrane is an azimuthally oscillating membrane.

The shear stress provided through the system of the present invention can be controlled by two variables (for a fixed cylinder membrane diameter), frequency and membrane displacement, rather than being controlled by just the rotation speed.

The internal diameter of the cylindrical membrane may be varied. Generally, the internal diameter of the cylindrical membrane will be fairly small. The chamber inside the cylindrical membrane contains the dispersed phase liquid about to be injected through the membrane. It is desirable that the dispersed phase liquid rotates in 'solid body oscillation' with the surrounding membrane component, such that inertia in the liquid is avoided whereas the continuous phase liquid on the other side of the membrane inertia is acceptable as it increases the shear at the membrane surface. By way of example only, for a 3-phase system a frequency of about 45 Hz and displacement of about 5 mm may be used. However, it will be understood that wider ranges could be achievable, such as, high frequency and lower displacement, by utilising different motor configuration, lighter shaft weight, etc.

The azimuthally oscillating membrane emulsification (AOME) system provides a significant advantage over an axially vibrating membrane system, since, inter alia, the body force of the liquid inside the membrane in an axially vibrating membrane system is proportional to the length of column of liquid inside the membrane and the angular velocity squared; causing momentary occurrences of localized high pressure at the peak positions of the vertical oscillation (i.e., top and bottom of the membrane tube).

Figure 2C:
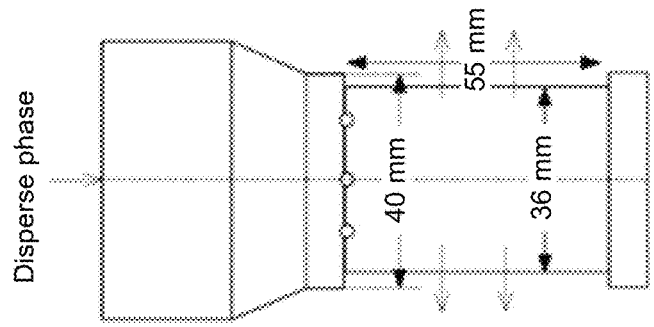
Figure 2A:
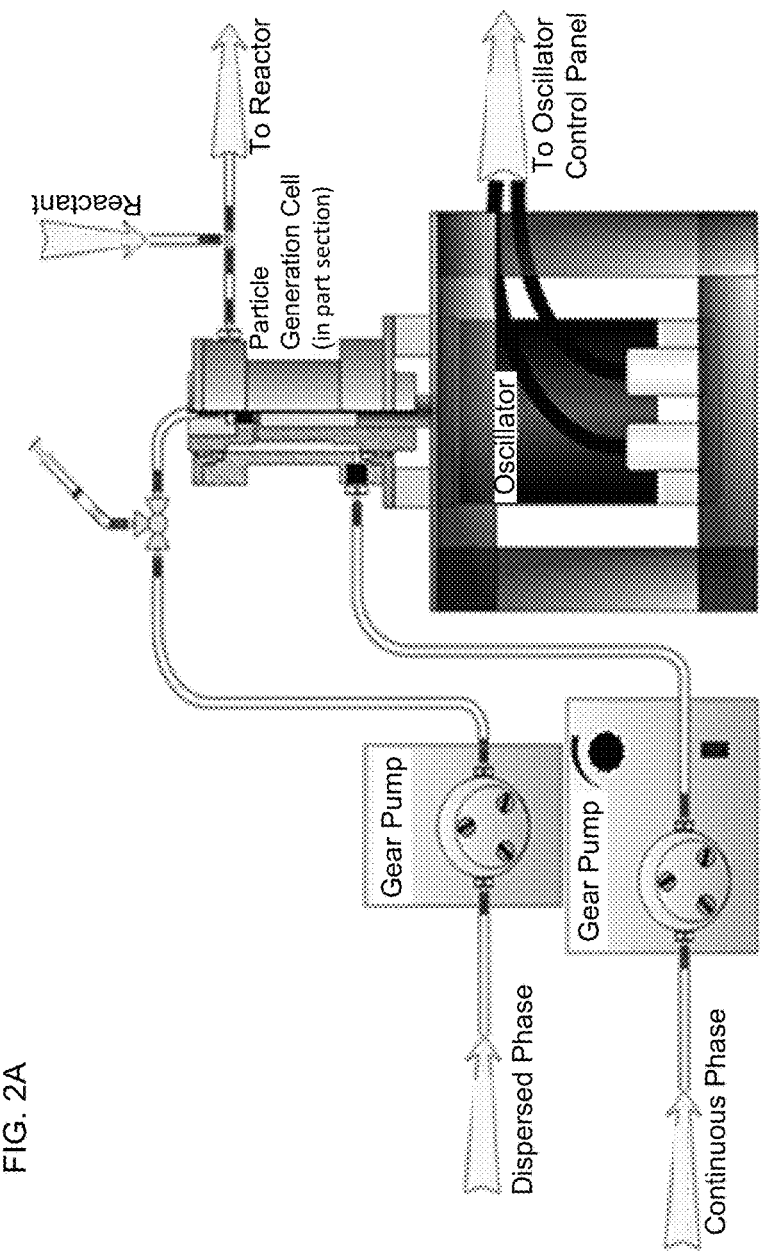

In the case of the AOME, by rotation back and forth, these momentary occurrences of high pressure at certain heights of the membrane do not exist. FIGS. 2A-C show the AOME system that was investigated in the present invention, evaluating its performance in terms of droplet size and uniformity.

In the apparatus or system of the present invention, crossflow of the continuous phase was used to recover the droplets generated in the module, rather than contributing to the shear used in droplet production, and concentrations of dispersed phase of up to 38% v/v were achieved in a single pass of continuous phase.

Comparison with operating a rotating cylindrical membrane and an azimuthally oscillating cylindrical membrane was achieved by considering a computational fluid dynamics (CFD) analysis of the two systems: membrane in full rotation and using oscillation, based on a consideration of the shear at the surface of the membrane being used to generate the drops.

In the experimental study of the present invention, the membrane surface material used was 316 stainless steel which, after being cleaned, was hydrophilic. The pores were uniformly spaced, with a pore diameter of from about 1 μm to about 100 μm, e.g. a 5 μm pore diameter and an interpore distance of 200 μm, providing a surface porosity of 0.05% of the surface area of the membrane. The distance between the pores is 40 times higher than the pore size ensuring that contact of emerging droplets is unlikely to occur. The average pitch of the membrane pores is about 75 μm.

However, in one aspect of the invention the membrane and/or the rotating shaft may be rendered substantially hydrophobic, for example by applying at least one layer of a hydrophobic coating. Examples of a hydrophobic coating include, but shall not be limited to, at least one fluoro-alkyl silane (FAS) compound.

FAS compounds generally comprise silicon atoms bonded to four chemical groups wherein one or more of the chemical groups contains fluorine and carbon atoms, and the remaining group(s) attached to the silicon atoms are typically alkyl (hydrocarbon), alkoxy (hydrocarbon attached to oxygen), or halide (e.g., chlorine) group(s). Exemplary types of FAS compounds include $CF_3(CH_2)_2Si(OCH_3)_3$, e.g. 3,3,3 trifluoropropyl)trimethoxysilane; $CF_3(CF_2)_5(CH_2)_2Si(OCH_2CH_3)_3$, e.g. tridecafluoro-1,1,2,2-tetrahydrooctyl-1-triethoxysilane; $CF_3(CH_2)_2SiCl_3$; $CF_3(CF_2)_5(CH_2)_2SiCl_3$; $CF_3(CF_2)_7(CH_2)_2SOCH_3)_3$; $CF_3(CF_2)_5(CH_2)_2Si(OCH_3)_3$; $CF_3(CF_2)_7(CH_2)_2SiCl_3$; $CF_3(CF_2)_7(CH_2)_2SiCH_3Cl_2$; and $CF_3(CF_2)_7(CH_2)_2SiCH_3(OCH_3)_2$.

Such an FAS coating may be applied in a variety of known methods, including, for example, dip-coating.

According to another aspect of the present invention, there is provided a system for membrane emulsification, said apparatus comprising: a membrane defining a plurality of apertures connecting a first phase on a first side of the membrane to a second phase on a second different side of the membrane, such that egression of the first phase into the second phase via the plurality of apertures creates an emulsion; and wherein the membrane is an oscillating cylindrical membrane.

According to a further aspect of the present invention, there is provided a method of preparing an emulsion using an apparatus as herein described, said emulsion comprising a first phase-in-second phase emulsion, wherein said method comprises: passing a first phase through a membrane defining a plurality of apertures connecting a first phase on a first side of the membrane to a second phase on a second different side of the membrane, such that egression of the first phase into the second phase via the plurality of apertures creates an emulsion; and wherein the membrane is an oscillating cylindrical membrane.

According to a further aspect of the present invention, there is also provided an emulsion prepared using a method as herein described.

Looking at industrial applications, AOME is more appropriate for production of "high technology" products and uses, for example, in chromatography resins, medical diagnostic particles, drug carriers, food, and flavour encapsulation, that is, in fields where there is a need for a high degree of droplet size uniformity, and above the 10 μm threshold below which simple crossflow with recirculation of the dispersion could be used to generate the drops.

The liquid droplets obtained using AOME could become solid through widely known polymerisation, gelation, or coacervation processes (electrostatically-driven liquid-liquid phase separation) within the formed emulsion.

The technique described in the present invention has a particular advantage of being easily interfaced with a reactor down-stream where polymerisation could occur and, if needed, functionalisation to obtain uniform functional particles.

The system, as illustrated in FIGS. 2A-C, could run continuously, which is desirable in sustainable industrial process, providing consistent product and high production rates, facilitating easy process automation and reduced down times. The stainless steel membrane used was found to be easy to clean and no measurable fouling occurred during testing, which is important for a continuous membrane emulsification process. Furthermore, this "sieve type" membrane design is less likely to foul than conventional "matrix" type of membrane due to the lack of interconnected and/or internal tortuous pore channels, such as those in fibre, glass, ceramic and sintered metal membranes.

In oscillatory flow, it is known that the Stokes boundary layer forms. It is within this boundary layer that the drops will be generated during membrane emulsification. The Stokes boundary layer thickness (6) is given by $$\delta = 2\pi \sqrt{\frac{\mu}{\pi f \rho}} \quad (1)$$

where μ and ρ are the dynamic viscosity and density of the surrounding fluid, respectively.

So, in water systems using a frequency of 10-50 Hz, the Stokes boundary layer thickness would be expected to be 1100 to 500 μm. If generating drops with diameters that are significantly below these values, one may conclude that the drops will be produced in a boundary layer and the bulk turbulence is not important, provided it is not sufficient to damage the drops after they have been formed. If the occurrence of turbulence and "turbulent bursts" near the membrane surface can be neglected, then it may be possible to correlate drop size with the shear stress at the membrane surface based on the wave equation for shear stress in an unbound fluid $$\tau = v_o \left(\frac{\omega_f \mu \rho}{2}\right)^{1/2} [\sin(\omega_f t) - \cos(\omega_f t)] \qquad (2)$$

where $w_f$ is the angular frequency, determined by $$\omega_f = 2\pi f \qquad (3)$$

where f is the frequency of the oscillation and $v_0$ is the peak velocity related to both the angular frequency and the amplitude ($\alpha$) of oscillation by the equation $$v_0 = \omega_f \alpha \qquad (4)$$

A "peak shear event" occurs when the value of wall shear provided by Eq. 5 is at a maximum $$\tau_{max} = \omega_f^{3/2} \alpha (\mu \rho/2)^{1/2} = 2\alpha(\pi f)^{3/2}(\mu\rho)^{1/2} \qquad (5)$$

The maximum shear occurs twice per cycle, and the maximum shear has been used in Eq. 6 for drop size in previous publications investigating vertical oscillation of the membrane and pulsation of the liquid over an otherwise stationary membrane $$x = \frac{\sqrt{18\tau^2 r_p^2 + 2\sqrt{81\tau^4 r_p^4 + 4r_p^2 \tau^2 \gamma^2}}}{3\tau} \qquad (6)$$

where $r_p$ is the pore radius, $\tau$ is the shear stress, $\gamma$ is the interfacial tension, and x is the droplet diameter.

To employ Eq. 6, the value of shear stress at the membrane surface must be known and in the case of oscillatory motion that shear will vary from zero to a maximum value. Further analysis of the shear field around the oscillating membrane can be elucidated by CFD modelling of the flow field, and a comparison of AOME with full rotation of the cylindrical membrane can also be achieved, to ascertain if there is any advantage to oscillating the membrane compared to simply rotating it.

Computational Fluid Dynamics Modelling

The Navier-Stokes and continuity equations were solved using low Reynolds number k-ε turbulent model available with Comsol Multiphysics™ version 5.0. Computations were performed with a 2-D axisymmetric cylindrical domain to allow a high mesh density near the walls to fully resolve for the flow field within the buffer region. The computational geometry was limited to the mid portion of the flow domain and the end effects were neglected to simplify the problem. The spatial domain reflected the geometry illustrated in FIG. 2B, with a gap between the inner rotating membrane and the stationary shroud of from about 0.5 mm to about 10 mm, e.g. about 5 mm. The boundary condition at the inner cylinder (membrane) was set as azimuthal velocity with a sinusoidal variation, although it will be understood that other waveforms, e.g. compound cosine waveforms, are possible. Continuous rotation of the inner cylinder, to compare with the oscillatory case, was also investigated. The outer cylinder was kept stationary by assigning no-slip conditions. Slip boundary conditions were used at the top and the bottom boundaries to neglect any viscous effects in these regions. The initial condition for each simulation was a stationary fluid in between the cylinders.

To assist convergence, the model was first solved using k-ε turbulent model which estimates velocity within the viscous sublayer using an analytical solution. Subsequently, this solution was used as the initial condition for solving the flow within the whole flow domain using low Reynolds number k-ε turbulent model. The inbuilt low Re k-ε model in Comsol uses AKN k-ε model that adapts turbulence transport equations by introducing damping functions. Mesh-independent solutions were obtained with 96,874 elements and confirmed using a higher mesh density of 257,950 elements. Here the term "mesh density" refers to the mesh that is used in the Computational Fluid Dynamics (CFD) numerical model. The total simulation time for each case was approximately 5 hours for computing the initial solution (using k-ε model) and the final solution (using low Reynolds number k-ε) on an Intel Core i7 64-bit 2.7 GHz processor.

For data processing and comparison between the two modes of operation (oscillation and full rotation of the cylindrical membrane), the Reynolds number is defined as $$Re = v_\varphi d/v \tag{7}$$

where $v_\varphi$ is the azimuthal velocity of the inner cylinder, d is the gap between the inner and the outer cylinder, and v is the kinematic viscosity of the fluid between cylinders.

BRIEF DESCRIPTION OF THE DRAWINGS

The present invention will now be described by way of example only, with reference to the accompanying figures in which:

FIG. 1 is a schematic representation of the longitudinal, azimuthal and radial modes of oscillation of a cylinder;

FIG. 2A is a schematic illustration of the AOME;

FIG. 2B is an overhead view of the shaft that contains the membrane, illustrating the oscillatory movement of the membrane;

FIG. 2C side view of the shaft with membrane covering lower parallel sided section (55 mm high and 40 mm diameter);

FIG. 3 is a CFD analysis modelling of full rotation of cylindrical membrane showing the foil nation and shedding of Taylor vortices with time from the surface of the membrane;

FIG. 4 is a CFD analysis modelling of full rotation of cylindrical membrane showing the shear rate at the surface of the membrane variation with time and the influence of the vortex shedding at the membrane;

FIG. 5 is a CFD analysis modelling of oscillatory rotation of cylindrical membrane at 20 Hz showing the shear rate at the surface of the membrane variation with distance from the membrane surface for four fixed times during a cycle;

FIG. 6 is an illustration of the oscillation wave form profiles used in the experiments;

FIG. 7 comprises photographs of emulsions produced using different operational parameters: A and B use compound cosine wave form; C and D use a sinusoidal wave form;

FIG. 8A is a plot of droplet size as a function of shear stress at different injection rates using two different wave forms: compound modified cosine (open symbols) and sinusoidal (closed symbols);

FIG. 8B is a plot of CV as a function of shear stress at different injection rates using two different wave forms: compound modified cosine (open symbols) and sinusoidal (closed symbols);

FIG. 9A is a plot of droplet size as a function of shear stress obtained with same shear stress using different combinations of displacement and frequency: Sine waves I and II use data obtained under conditions reported in Tables 1 and 2, respectively;

FIG. 9B is a plot of CV as a function of shear stress obtained with same shear stress using different combinations of displacement and frequency: Sine waves I and II use data obtained under conditions reported in Tables 1 and 2, respectively; and FIG. 10 is a plot of droplet size and CV variation as a function of oil phase in emulsion concentration using a sinusoidal wave form.

DESCRIPTION OF A PREFERRED EMBODIMENT

Materials

The oil in water (o/w) emulsions were produced using 2 w/w Tween 20 (polyoxyethylene sorbitan monolaurate, Sigma Aldrich, UK) in distilled water as the continuous phase and food grade sunflower oil as the dispersed phase. The reported value of the interfacial tension for this system is 0.004 N m$^{-1}$, and the measured viscosities for 2 w/w Tween 20 solution in water and sunflower oil are 0.001 and 0.039 Pa s, respectively.

Setup

The o/w emulsions were obtained using an azimuthally oscillating membrane system (AOME) illustrated in FIG. 2A-C (Micropore Technologies Derbyshire, UK). The dispersed and continuous phases were injected using gear pumps (Ismatec®, IDEX Health & Science, Wertheim, Germany). The oscillation signal was provided by a control panel which was connected to the oscillator motor providing separate control over the frequency and membrane displacement (defined as being the peak to peak distance in the cycle and, therefore, twice the amplitude of the oscillation). This device is able to generate frequencies up to 50 Hz and displacements up to 7 mm (on a 40 mm diameter cylinder). A single sieve-type membrane was used, which has uniform laser drilled 5 μm pores with a distance between the pores of 200 μm. The membrane was laser welded to a cylindrical stainless steel body, FIG. 2B, with an outside diameter of 40 mm and working height of 55 mm. The membrane surface area was 52 cm$^2$ and the surface open area was 0.05. The geometric characteristics of the membrane are also given in FIG. 2B. The dispersed phase was injected from the top of the membrane, FIG. 2C, filling the dead volume behind the membrane. After this volume is filled, the dispersed phase permeates thorough the pores of the membrane, into the continuous phase which is gently crossflowing in the upward direction to collect the droplets and transfer them to a downstream vessel.

Membrane Cleaning and Use

The membrane cleaning procedure consisted of soaking the membrane in 4 M NaOH solution for 10 min, followed by rinsing with tap water and then placing in distilled water for 1 min. Afterwards, the membrane was soaked in 2% w/w citric acid solution for 10 min, rinsed with tap water, and again placed in distilled water for 1 min. Finally, the membrane was pre-soaked in the continuous phase for at least 10 min, before placing it in the membrane assembly. Every time that the membrane solution was changed, an ultrasonic bath was used briefly to promote the cleaning and/or remove any air bubbles that may be present in the membrane pores.

After cleaning and pre-soaking in the continuous phase, the membrane was mounted in its housing, and the housing connected to the oscillatory electric motor. Prior to the experiment, both the outer and inner sides of the membrane were filled with continuous phase and all the air was removed through the bleed valves to ensure that all the pores of the membrane were submerged in continuous phase and available to the emulsification process. At the end of every experimental day, the membrane was cleaned, with brief ultrasonic treatment and overnight soaking using a regular domestic detergent.

Determination of Mean Droplet Size and Droplet Size Distribution

The average droplet diameter is expressed as the volume median diameter D(V,0.5), which is the diameter corresponding to 50% on the cumulative volume distribution curve. Droplet size uniformity is expressed in terms of the coefficient of variation (CV):

$$CV = \frac{\sigma}{\mu} \times 100 \qquad (8)$$

where σ is the standard deviation and μ is the mean of the volume distribution curve.

The CV and D(V,0.5) values reported were obtained using three analytical methods: a stereoscopic microscope (static image analysis), Vision 500™ (dynamic image analysis) Micropore Technologies, UK, and a Multisizer™ 3 Coulter Counter®. A large number of (typically several hundred) drops were counted and measured using the microscope and Image J (image processing software) to confirm the data obtained from the Vision 500 and Coulter Counter. Once the preliminary sizing tests were completed, and robust sizing techniques confirmed, data from the Vision 500 were used when the D(V,0.5) was above 45 μm and for Dev, 0.5) below 45 μm, the Coulter Counter data are reported.

The Coulter and Vision 500 systems gave identical results around these sizes, but for sizes with a significant amount of the distribution below 20 μm the online Vision system thresholding was not reliable, hence offline tests using the Coulter were used for the smaller drops. In all cases, static and dynamic image analyses as well as Coulter electric zone sensing, are well known "primary" techniques directly measuring the drop size distribution, which is deemed to be more reliable than "secondary" techniques such as laser diffraction.

Results

Comparison between an azimuthally oscillating cylindrical system and one fully rotating around its axis was achieved by CFD for the same azimuthal (tangential) velocity, and Reynolds number, as that achieved when using an oscillation frequency of 20 Hz and oscillation amplitude of 1 mm; that is based on the maximum velocity achieved during the oscillatory cycle. Using the dimensions of the membrane, this gave a peak azimuthal velocity of 0.126 m s$^{-1}$ and Re of 630. The CFD simulation of the membrane using full rotation provided the local velocities illustrated in FIG. 3, where after 2 s of operation it is possible to see continuous phase vortices being formed at the membrane surface and then shedding from the surface after another 2 s. The occurrence of these vortices complicates the shear rate relation with time as shown in FIG. 4; where it can be seen that the average shear approached a uniform value of between 40 and 60 s$^{-1}$, but with a burst of up to 160 s$^{-1}$ between 2 and 4 s, which corresponded to vortices occurring and then shedding from the surface of the membrane. These vortices are illustrated in FIG. 3. Clearly, the frequency and magnitude of these vortices will depend on the dimensions of the rotating cylindrical membrane and the gap between the membrane and the surrounding stationary shroud. In the case investigated here, this was 5 mm, the same as shown in FIG. 2C. FIG. 5 shows the CFD prediction of the variation of shear rate with respect to distance within the gap for the azimuthally oscillating membrane. At radial distances greater than about 0.5 mm from the membrane surface, the shear generated by the membrane oscillation is negligible. The membrane starts to oscillate at zero time and although the period of oscillation is 0.05 s, FIG. 5 covers the time interval from 0.175 to 0.2 s to allow sufficient time for liquid acceleration to occur. The shear at the membrane surface reaches a peak value of 1400 $s^{-1}$ at a time of 0.18 s after the start of the cycle analysed (see cut-out diagram in FIG. 5). The membrane stops, and reverses direction at a time of 0.1875 s, and the momentum of the surrounding water can clearly be seen to provide a phase lag to the motion of the membrane. At 0.2 s, the shear profile is identical to that shown at 0.175 s, but in the reverse direction. The process carries on thereafter in a cyclical manner. The analysis shown in FIG. 5 is for a frequency of oscillation of 20 Hz, the total time period shown in the cut-away diagram in FIG. 5 is 0.05 s, the shear illustrated in the figure occurs twice every cycle; hence, there would be 40 "peak shear" events per second. The shear is substantially varying at the surface of the membrane during the cycle, but the same value of shear exists at every location over the membrane at any instance in time and it is believed that the drops will be released from the membrane surface during, or near to, a "peak shear event"; that is, when the shear is greatest at the membrane surface over the entire surface of the membrane. This contrasts with the velocity and shear profiles for the fully rotating cylinder illustrated in FIGS. 3 and 4, where the shear at the membrane surface varies axially depending on the presence, or otherwise, of a vortex which is a local event on the surface that occurs above a certain critical Reynolds number. Clearly, these occur even when operating at relatively low shear rates illustrated in FIG. 4: where the shear rate at the membrane surface can be seen to vary by 100 (i.e., 80-160 $s^{-1}$). The vortices have a time period much greater than 1 s, see FIG. 3, and it is highly likely that liquid drops will emerge from the membrane much more frequently than this, so for the fully rotating membrane drops will be produced at the membrane surface under conditions of substantially varying shear at different locations over the membrane. This is likely to give rise to a wide drop size distribution.

Another aspect that is notable from FIG. 5 is that the peak shear rate for an oscillation of 20 Hz and amplitude of oscillation of 1 mm is of the order of 1000 $s^{-1}$, which is similar to the value calculated using Eq. 5 using the coefficient of dynamic viscosity of water (the continuous phase liquid) to convert between shear stress and shear rates.

During the oscillation, the oscillatory Reynolds number varies from 0 to 630, from conditions of laminar flow to a high degree of turbulence, depending on the position within the oscillatory cycle. Clearly, these are highly non-steady-state conditions, but the key aspect to the successful operation of the system is that the shear is identical at all positions over the surface of the membrane at any instance in time, something that is not true for the fully rotating cylinder using a gap of 5 mm. A comprehensive analysis of flow regimes around a rotating cylinder demonstrates, at these Reynolds numbers, flow patterns that vary between Taylor vortex flow, Wavy vortex flow, and Modulated waves, which is consistent with the flow patterns illustrated in FIGS. 3 and 4. It would be possible to operate a fully rotating cylinder in a system with a much wider gap, or even in an unbounded fluid, and this can be used as an effective technique for laboratory investigation of membrane emulsification and formulation testing. However, doing so limits the scalability of the system for a production environment. Using oscillation, instead of a fully rotating cylinder, it is possible to obtain dispersed phase concentrations as high as approaching 40% v/v using a single pass of continuous phase cross-flow over the membrane surface, as shown later, which provides a more practical operating environment for membrane emulsification.

Very high-speed continuous rotation of a cylinder, and a very narrow gap, with consequent high shear has been used for the production of finely dispersed drops. In this case, the varying shear from the vortices has only limited effect on the overall shear which is dominated by rotation of the membrane, which can reach 10,000 rpm in a MEGATRON MT-MM emulsification device. However, these operating principles are not relevant to the production of larger drop sizes, in the region of 10-200 μm, which is the focus of the work reported here. Hence, the full rotation of a cylindrical membrane may be appropriate under certain circumstances: for small drops or for small-scale laboratory testing of formulations, but the comparative CFD modelling appears to demonstrate that the azimuthally oscillating membrane arrangement can be used to generate a consistent shear over the entire surface of the membrane, with no localized inconsistencies in the shear or pressure fields (under the conditions investigated) and that the shear field is limited to a region very close to the membrane surface (see FIG. 5 and Eq. 1). In addition to these advantages, the drops will not centrifugally be induced inward toward the membrane surface (as they will be for full rotation where the dispersed phase is less dense than the continuous phase) and the use of oscillation will provide conditions where the emerging disperse phase drops will not be distorted severely in just one direction, making the "wetting" of the membrane more likely as can be seen from CFD work employed on crossflow membrane emulsification systems. The CFD modelling was accomplished using the physical properties of water. At low dispersed phase volumes of oil in water, the continuous phase properties will be similar to water. However, at high concentrations of oil in water, for example, 30% v/v, it is likely that the continuous phase properties will be different, and some degree of damping will occur. Hence, the information contained in FIGS. 3-5 is only relevant to low dispersed phase volumes.

Table 1 contains the operational parameters used in the experiments to test the type of wave form used: compound cosine wave form or sinusoidal. The wave form should make little difference to the drops produced (size and size distribution) if the important parameter is the "peak shear" that is obtained during an oscillation. The two wave forms are represented in FIG. 6. The sinusoidal wave form generates a sine velocity function with respect to time and the compound cosine wave form has multiple accelerations per period (wavelength) resulting from a combination of a number of cosine waves. For these wave forms, a wide range of "peak" shear stress values were tested from 1.4 to 14.2 Pa and for each oscillation displacement value, three different oscillation frequencies and injection rates of the dispersed phase were tested. The peak shear stress is defined as being the maximum shear stress attained during the oscillation cycle as provided by Eq. 5. The operational parameters reported in Table 1 were repeated, switching the compound cosine wave form to a purely sinusoidal wave form. In all cases, the oil in water concentration of the dispersion formed was maintained at 20% v/v by maintaining the correct ratio of continuous to dispersed phase flows.

TABLE 1

Operational Conditions Tested in the Comparison of Two Wave Forms

| Displacement (mm) | Frequency (Hz) | Shear Stress (Pa) | Injection Rate (L/h) | Superficial Velocity (L/(m² h)) | Continuous Phase Rate (L/h) | O/W (v/v) (%) |
|---|---|---|---|---|---|---|
| 2 | 20; 35; 45 | 1.4; 3.3; 4.7 | 0.06; 0.24; 0.72 | 11.5; 46.1; 138 | 0.24; 0.96; 2.88 | 20 |
| 4 | 20; 35; 45 | 2.8; 6.5; 9.5 | 0.06; 0.24; 0.72 | 11.5; 46.1; 138 | 0.24; 0.96; 2.88 | |
| 6 | 20; 35; 45 | 4.2; 9.8; 14.2 | 0.06; 0.24; 0.72 | 11.5; 46.1; 138 | 0.24; 0.96; 2.88 | |

FIG. 7 shows representative images obtained under the different conditions described above. A good degree of uniformity between the drops can be seen and there is no obvious difference between the degree of uniformity provided by the two different wave forms used: in FIGS. 7A, B, the CVs are 15 and 10, respectively, and in FIGS. 7C, D, the CVs are 13 and 11, respectively. This conclusion is supported in FIG. 8; where the median drop size and uniformity (in terms of CV) are plotted as a function of the maximum shear stress for the compound cosine and sinusoidal wave forms. The model represented by Eq. 6 is also plotted in FIG. 8. It is noticeable that at the lowest injection rate (0.06 L/h) the measured drop sizes are very close to the predicted values for all shear stresses presented, for both wave forms used. It is also noticeable that the drop sizes increase with an increase in injection rate: the drop size being significantly greater than the model prediction at the highest injection rate (0.72 L/h). This is a common observation on the use of the model represented by Eq. 6, which does not include any term for the injection rate. Hence, it is an equation that is only valid for very low injection rates.

Comparison of the drop uniformity also shows that there is little difference between the two wave forms: CVs ranging from 8 to 21 for the compound cosine wave form and 9 to 19 for the sinusoidal wave form. In general, for both wave forms the CVs were between 10 and 14. These values are considerably poorer than what can be achieved using a single capillary microfluidic system, but the productivity of ME systems is many orders of magnitude greater than what can currently be achieved with microfluidic systems in practice.

Also shown on FIG. 8A is an expanded section for one set of data at a shear stress of 6.5 Pa, to illustrate the reproducibility of the OME system. All the tests were repeated three times and the bars illustrated in the expanded section show the data range obtained for the data illustrated. It would not be possible to see the data range plotted on the figure without expansion as the range is very narrow, demonstrating a very high degree of reproducibility of the system. The reproducibility of the CV values was not so tight, and the error bars representing the data range are visible for the example plot of data taken at 0.24 L/h on FIG. 8B. However, the range is still relatively narrow and the reproducibility of the data appears to be very good. Median droplet diameter variation from the model prediction is proportional to the injection rate: at low injection rate the model is adequate; at high injection rate the drops are substantially bigger. The type of wave form used appears to have no influence on this variation.

TABLE 2

Operational Conditions Tested in the Shear Stress Evaluation

| Displacement (mm) | Frequency (Hz) | Shear Stress (Pa) | Injection Rate (L/h) | Superficial Velocity (L/(m² h)) | Continuous Phase Rate (L/h) | O/w (v/v) (%) |
|---|---|---|---|---|---|---|
| 3 | 15; 27; 34 | 1.4; 3.3; 4.7 | 0.06; 0.24; 0.72 | 11.5; 46.1; 138 | 0.24; 0.96; 2.88 | 20 |
| 6 | 15; 27; 34 | 2.8; 6.5; 9.4 | 0.06; 0.24; 0.72 | 11.5; 461; 138 | 0.24; 0.96; 2.88 | |
| 7 | 18; 32; 41 | 4.2; 10.0; 14.4 | 0.06; 0.24; 0.72 | 11.5; 46.1; 138 | 0.24; 0.96; 2.88 | |

In Table 2, additional combinations of membrane displacement and frequency are reported, providing shear stress values between 1.4 and 14.4 Pa and extending (in combination with the data in Table 1) the range of frequencies tested to between 15 and 45 Hz; and range of displacements to between 2 and 7 mm, for the sinusoidal wave form. All the resulting data are plotted in FIG. 9A, sine wave II corresponding to conditions provided in Table 2, and it can be seen that all the drop size data can be correlated with the shear stress for each injection rate in a similar way to that provided by Eq. 6, but with a different correlation for the different injection rates, as seen before in FIG. 8. The data illustrated in FIG. 9A show that it is the shear at the surface of the membrane that is important in determining the drop size, regardless of how that shear is obtained from a combination of frequency or amplitude of the wave form. However, the data illustrated in FIG. 9B does appear to suggest that if the narrowest size distribution is required, then the operator may wish to investigate carefully all of the operating conditions; for example, at a shear stress of 4.7 Pa the resulting CVs of distributions varied between 8 and 20 depending on the selected operating conditions of: frequency, amplitude, injection rate, and continuous phase flow rate. Hence, the drop size may be a function of shear regardless of the conditions used to generate it, but the uniformity of the distribution is influenced by many more parameters than just the shear.

One of the main advantages of a ME system that provides a means for controlling the shear at the membrane surface that is independent of the flow of continuous phase, that is being used to remove the dispersed phase drops, is that it should be possible to achieve high dispersed phase concentrations by using a relatively high injected phase flow to the continuous phase flow. In a crossflow system, which relies on the continuous phase flow to generate the shear at the membrane surface, such an independent means does not exist and the only way that high concentrations of dispersed phase can be achieved is to recycle the dispersion through the membrane module. This can lead to droplet breakup within the pump and fittings, leading to a poorer drop size distribution. The OME does provide an independent means for controlling the shear and a series of tests were performed to investigate the influence of the dispersed phase oil loading while maintaining conditions of constant shear. The operating conditions are provided in Table 3, where the continuous phase flow rate was held constant (0.9 L/h) and the injection rate of the dispersed phase was varied in the range of 0.09-0.54 L/h, resulting in the dispersed phase concentrations in the final emulsion provided in the table.

fully rotating it, include: controlling the shear in a narrow region close to the membrane surface, the body force on the lighter drops being formed does not direct the drops toward the membrane surface and the avoidance of deforming the dispersed phase toward the membrane surface in a single direction (likely to induce membrane wetting).

An experimental investigation of OME was performed using sunflower oil injected into water containing a surfactant to provide droplets with a diameter of 20-120 μm using a 5-μm pore size laser drilled stainless steel membrane. Under optimal conditions, CV values of around 8% were achieved. There were no detected relevant differences in

TABLE 3

Operational Conditions Tested in the Oil Loading Test

| Displacement (mm) | Frequency (Hz) | Shear Stress (Pa) | Injection Rate (L/h) | Superficial Velocity ($L/m^2 h$)) | Continuous Phase Rate (L/h) | O/W (v/v) (%) |
|---|---|---|---|---|---|---|
| 2 | 45 | 4.7 | 0.09 | 17.3 | 0.9 | 9.1 |
|   |    |     | 0.18 | 34.6 |     | 17  |
|   |    |     | 0.27 | 51.9 |     | 23  |
|   |    |     | 0.36 | 69.2 |     | 29  |
|   |    |     | 0.45 | 86.5 |     | 33  |
|   |    |     | 0.54 | 104  |     | 38  |

The resulting emulsions obtained are shown in FIG. 10.

The uniformity of the distribution is similar, regardless of the dispersed phase concentration, with CV values between 9 and 11, for dispersed phase concentrations between 17 and 33% v/v. The operating conditions for shear were selected as being those that provided the best uniformity and the uniformity remained good for all injection rates, and therefore, dispersed phase concentrations, up to a value of 33% v/v, deteriorating slightly at a dispersed phase concentration of 37% to a CV value of 18%. For comparison, using a similar formulation and membrane type operated using a different method of generation of shear at the membrane surface (pulsed flow) provided dispersed phase concentrations of up to 45% v/v with uniformity values determined by a "span" value of 0.4 (where lower span values indicate a more uniform distribution); span values obtained using the OME system described here were ~0.2 and even the worst span value (at 37% v/v) was significantly better than during pulsed flow, at a value of 0.33.

CONCLUSIONS

In ME, there are many different methods by which the shear may be provided at the membrane surface. The most appropriate method depends on the requirements of the operator, including the possible intention to scale the process to different levels of productivity. When aiming to produce droplets with drop diameter greater than 20 μm, and at up to high dispersed phase concentrations, then oscillating a cylindrical membrane in an azimuthal oscillatory (rotational) fashion has a number of advantages. A CFD analysis of the continuous phase around such a membrane has shown that, at the conditions investigated, there are no axial variations in shear and pressure at the membrane surface: all positions on the membrane experience the same shear and pressure at any instance in time. This was not the case when using the CFD to model a fully rotating cylinder, where local vortices in the continuous phase were formed leading to variable shear along the axis of the fully rotating cylindrical membrane. Other advantages to oscillating the membrane, rather than using different wave forms on the average droplet size and uniformity of the distributions. The droplet size could be predicted, for low injection rates, using a model for drop size based on the peak shear at the membrane surface, the membrane pore size, and the interfacial tension between the two liquid phases. The drops produced depended on the shear at the membrane surface, and not the combination of frequency and membrane displacement used to create that shear.

The OME technique has the ability to produce very high dispersed phase concentrations, up to 33% v/v and gave narrow drop size distributions (9-11% CV) without the need to recirculate the continuous phase, and used low shear stresses (2-5 Pa) over a very narrow region next to the membrane surface and is, therefore, a system well suited to fragile droplets and delicate formulations that may be damaged by high shear conditions. The drop size distributions from the system were very reproducible and the technique could in principle be scaled to different diameter and length membrane cylinders.

The examples presented herein are intended to illustrate potential and specific implementations of the present disclosure. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure.

The aspects, embodiments, features, and examples of the disclosure are to be considered illustrative in all respects and are not intended to limit the disclosure, the scope of which is defined only by the claims. Other embodiments, modifications, and usages will be apparent to those skilled in the art without departing from the spirit and scope of the claimed invention.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed is:

1. Apparatus for membrane emulsification, said apparatus comprising:
   a membrane defining a plurality of apertures connecting a first phase on a first side of the membrane to a second phase on a second different side of the membrane,
   such that egression of the first phase into the second phase via the plurality of apertures creates an emulsion; and
   wherein the membrane is an oscillating cylindrical membrane connected to a motor having a controller for azimuthal oscillation.

2. Apparatus according to claim 1 wherein the membrane comprises pores that have a diameter of from about 1 µm to about 100 µm.

3. Apparatus according to claim 2 wherein the average pitch of the pores is about 75 µm.

4. Apparatus according to claim 2 wherein the distance between the pores is about 3 times to about 40 times higher than the pore size.

5. Apparatus according to claim 4 wherein the distance between the pores is about 40 times higher than the pore size.

6. Apparatus according to claim 1 wherein the membrane comprises pores that have a diameter of about 5 µm.

7. Apparatus according to claim 1 wherein the membrane comprises pores that are uniformly spaced.

8. Apparatus according to claim 7 wherein the distance between pores is about 200 µm.

9. Apparatus according to claim 1 wherein the membrane has a surface porosity of about 0.05% of the surface area of the membrane.

10. Apparatus according to claim 1 wherein the membrane comprises an inner rotating membrane and a stationary shroud.

11. Apparatus according to claim 10 wherein a gap between the inner rotating membrane and the stationary shroud is from about 0.5 mm to about 10 mm.

12. Apparatus according to claim 11 wherein the gap between the inner rotating membrane and the stationary shroud is about 5 mm.

13. Apparatus according to claim 1 wherein the membrane is connected to the oscillator motor having a controller to provide an azimuthal velocity that includes a sinusoidal variation.

14. Apparatus according to claim 1 wherein the membrane comprises stainless steel.

15. Apparatus according to claim 14 wherein the membrane comprises 316 stainless steel.

16. A system for membrane emulsification, said apparatus comprising:
   a membrane defining a plurality of apertures connecting a first phase on a first side of the membrane to a second phase on a second different side of the membrane,
   such that egression of the first phase into the second phase via the plurality of apertures creates an emulsion; and
   wherein the membrane is an oscillating cylindrical membrane connected to a motor having a controller for providing azimuthal oscillation.

17. A method of preparing an emulsion using an apparatus as claimed in claim 1, said emulsion comprising a first phase-in-second phase emulsion, wherein said method comprises:
   passing a first phase through a membrane defining a plurality of apertures connecting a first phase on a first side of the membrane to a second phase on a second different side of the membrane,
   such that egression of the first phase into the second phase via the plurality of apertures creates an emulsion; and
   wherein the membrane is an oscillating cylindrical membrane.

18. A method according to claim 17 wherein the membrane is an azimuthally oscillating membrane.

* * * * *